United States Patent
Hutchison et al.

(10) Patent No.: US 6,629,118 B1
(45) Date of Patent: Sep. 30, 2003

(54) ZERO RESULT PREDICTION

(75) Inventors: Guy Townsend Hutchison, Santa Clara, CA (US); David William Steer, Los Gatos, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/454,606

(22) Filed: Dec. 7, 1999

(30) Foreign Application Priority Data

Sep. 9, 1999 (GB) ................................. 9921327

(51) Int. Cl.⁷ .......................... G06F 15/00; G06F 7/50
(52) U.S. Cl. ................ 708/525; 708/671; 340/146.2
(58) Field of Search ............ 708/525, 670–671; 340/146.2

(56) References Cited

U.S. PATENT DOCUMENTS

| | | | |
|---|---|---|---|
| 4,648,059 A | * 3/1987 | Gregorcyk | ............... 708/671 |
| 5,144,577 A | 9/1992 | Linnenberg | |
| 5,581,496 A | 12/1996 | Lai et al. | |
| 5,604,689 A | * 2/1997 | Dockser | ............... 708/525 |
| 6,292,818 B1 | * 9/2001 | Winters | ............... 708/671 |

FOREIGN PATENT DOCUMENTS

| | | |
|---|---|---|
| JP | 61048038 | 3/1986 |
| WO | WO 96/10784 | 4/1996 |

\* cited by examiner

Primary Examiner—Tan V. Mai
(74) Attorney, Agent, or Firm—Nixon & Vanderhye P.C.

(57) ABSTRACT

A zero result detector for detecting a zero result in the sum of a first operand A, a second operand B and a carry bit Cin operates by calculating $\bar{A}$ and $\bar{A}+1$ and then comparing one of these with B (Cin=0, $\bar{A}$; Cin=1, $\bar{A}+1$) in dependence upon Cin. If the comparison shows equality, then the zero detect result Z is true.

8 Claims, 1 Drawing Sheet

ZERO RESULT PREDICTION

BACKGROUND OF THE INVENTION

1. Field of the Invention

This invention relates to a zero result detector and a method of detecting a zero result.

2. Description of the Prior Art

The detection of a zero result during microprocessor operations is important as it may form a critical timing path, for example, in the control of conditional program execution. As an illustration, consider the situation where the result of a sum of two numbers is to be used as a denominator in a subsequent division operation, zero detection of the result can be used to avoid a division by zero in the subsequent operation and processing speed increased if this zero detection result is available sooner.

A zero detect function may generate a Boolean result that is TRUE, when the result of an arithmetic or logical operation has all bits set low, and FALSE when one or more bits are set high. This could be done by applying an N-bit wide NOR calculation to the output of an arithmetic logic unit (ALU) This is however slow, since the NOR function cannot begin until the result is available from the ALU. For a logical operation this may not be a problem, however, arithmetic operations tend to be a lot slower due, for example, to carry propagation and so the late availability of the zero detect becomes a limiting factor.

Measures that can increase the speed at which a zero detection result becomes available are strongly advantageous. Furthermore, it is important that early zero detection circuitry should not disadvantageously add to the size, cost and complexity of the system as a whole.

U.S. Pat. No. 5,604,689 and U. S. Pat. No. 5,020,016 both describe known early zero detect circuits.

SUMMARY OF THE INVENTION

In accordance with one aspect of the present invention there is provided a zero result detector for detecting when the sum of a first number A, a second number B and a carry bit C is equal to zero, wherein A and B are binary numbers, the zero result detector comprising:

a first number generator operative to generate a number representing a negative value of A, −A;

a second number generator operative to generate a number representing a negative value of A minus 1, −A−1;

a selector operative to select the output of the, first number generator or the output of the second number generator in response to the value of the carry bit;

a comparator operative to generate a zero result signal indicative of the sum being zero in dependence upon a comparison of the selected value with the value of the second number B.

The device of the present invention provides a relatively simple mechanism for detecting a zero result without performing a complete arithmetic operation on the input numbers. The zero result is calculated in parallel to the arithmetic operation using the input operands to predict a zero, rather than performing a zero detection on the result of the addition. This can significantly increase the speed of processing of various operations.

In preferred embodiments operation of the first number generator, the second number generator and the selector is independent of the second number B such that the second number B may be input to said zero result detector later than the first number A.

The structure of the zero result detector of the invention makes it particularly effective in applications where one operand is available before a late arriving second operand. For example, in cases where the second operand B is barrel shifted prior to adding it to A.

Advantageously, the first and second number generators use 2's complement notation for representing negative values. 2's complement is a particularly effective notation for representing negative numbers as standard addition logic can correctly deal with such negative numbers.

In preferred embodiments, the second number generator for generating a number representing the negative value of A minus 1, comprises an inverter for inverting the first number A; and the first number generator for generating a number representing a negative value of A comprises an inverter for inverting the first number A and an incrementor for adding 1 to the output of the inverter.

This logical circuit provides an efficient manner of producing the required manipulated versions of the first number A.

Preferably, the inverter of the first number generator and the inverter of the second number generator are the same single inverter.

In accordance with a further aspect of the present invention there is provided a method of detecting a zero result of a sum of a first number A, a second number B and a carry bit C, wherein A and B are binary numbers, the method comprising the steps of: generating a first number representing a negative value of A, −A;

generating a second number representing a negative value of A minus 1, −A−1;

selecting either the first number or the second number in response to the value of the carry bit;

comparing the selected value with the value of the second number B; and generating a zero result signal indicative of the sum being zero when the values are equal.

The above, and other objects, features and advantages of this invention will be apparent from the following detailed description of the illustrative embodiments which is to be read in connection with the accompanying drawing.

DESCRIPTION OF THE PREFERRED EMBODIMENTS

Figure 1:
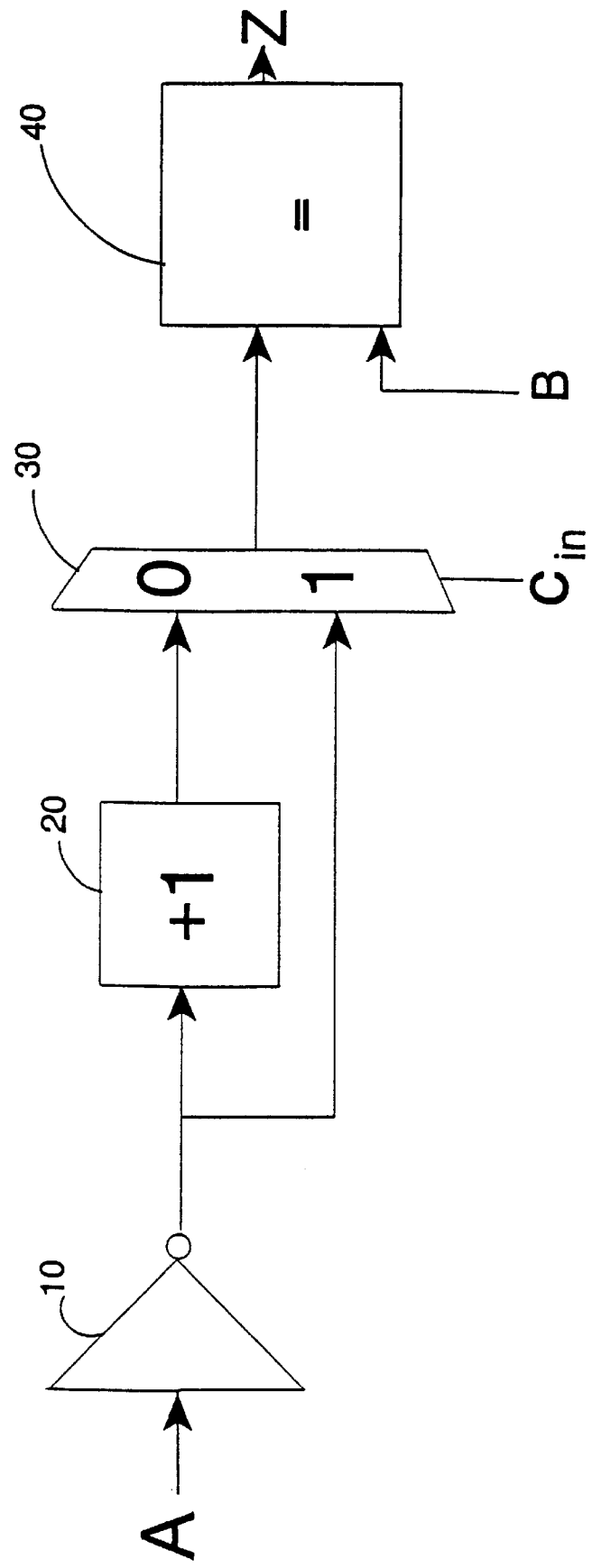
FIG. 1 illustrates a zero result predictor according to an embodiment of the invention.

With reference to FIG. 1, a zero result predictor according to an embodiment of the invention is shown. The device comprises an inverter 10 for inverting an input operand A, an incrementor 20 for incrementing this operand by 1, a selector 30 and a comparator 40.

An input operand A is inverted via an inverter 10, this inverter comprises a plurality of NOT-gates arranged in parallel, each NOT-gate arranged to receive as an input one of the bits of the A operand. The inverted value of A is then split into two lines, one of these is fed to an incrementor 20 wherein its value is increased by one, the other going as an input to a selector 30. The selector 30 has a third input that consists of a carry input Cin for the sum and it acts to select one of the other two inputs i.e. $\overline{A}$ or $\overline{A}+1$ based on the value of the carry input Cin (Cin=0 selects $\overline{A}+1$; Cin=selects $\overline{A}$).

The result from the selector is then sent to a comparator 40 where it is compared with a second operand B. The comparator 40 consists of a plurality of exclusive OR-gates arranged in parallel such that each bit of the two input numbers are exclusive 'OR'ed together. If all of the bits of the two numbers are equal, then zeros are output from each gate. If any of the bits are not equal then a one will be output from that gate. The outputs from the exclusive OR-gates are themselves "NOR"ed together to generate a zero detect result Z of 1 if the two numbers are equal and 0 if not. A result of 1 from the comparator may be used to indicate that a zero result will result from the full arithmetic operation that is proceeding in parallel.

By way of example of the operation of the circuit of FIG. 1 consider the following examples. If A=+7 and B=−7, then A in binary is given by 00000111 and B is given in binary in a 2's compliment notation as 11111001. The inverter 10 produces a value of $\overline{A}$ that is 11111000. This value of $\overline{A}$ is applied in parallel to the incrementor 20 and the selector (multiplexer) 30. The incrementor 20 increments the value of $\overline{A}$ input to it by 1 to produce an output of 11111001. The output from the incrementor 20 is supplied to the other input of the selector 30.

The selector 30 selects one of its inputs to be passed onto the comparator 40 in dependence upon the carry in bit Cin. In this example, the carry in bit Cin is 0 and so the output of the incrementor 20 is passed to the comparator 40. The comparator 40 thus compares $\overline{A}$+1 with B. Both of these inputs have the value 11111001. Accordingly, the zero detect result Z generated by the comparator 40 is 1.

In the above example, it will be appreciated that if the carry in input Cin had been 1 rather than 0, then the selector 30 would have selected the other input and the comparator 40 would not have found equality between its two inputs. In this circumstance the zero detect result Z would have been 0 as required.

Consider the example of the situation in which A is −42, B is +41 and Cin is 1. In binary representation A is 11010110 (2's compliment) and B is 00101001. The output from the inverter 20 is 00101001 and this is applied directly to one input of the selector 30. The output of the inverter 10 is also incremented by the incrementor 20 to produce a value of 00101010 that is supplied to the other input of the selector 30. The selector 30 is controlled by the carry input Cin having a value of 1 to select the value 00101001 for supply to the comparator 40. The second input operand B (that can be supplied significantly later), is also equal to 00101001 and so the zero detect result Z is 1.

Finally, consider the example where A is 129, B is −4 and Cin is 0. In this case the binary representations are A is 10000001 and B is 11111100. The value of $\overline{A}$ is 01111110 and the value of $\overline{A}$+1 is 01111111. The binary input of 0 results in the $\overline{A}$+1 value being supplied to the comparator 40 by the selector 30. The other input to the comparitor 40 is B, i.e. 11111100. The comparitor 40 determines that the two input values supplied to it are not equal and accordingly the zero detect result Z is given as 0. This non equality is unchanged by whatever the carry input Cin value is used since the two input operands A and B are very different.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claim.

We claim:

1. A zero result detector for detecting when the sum of a first number A a second number B and a carry bit C is equal to zero, wherein A and B are binary numbers, the zero result detector comprising:

a first number generator operative to generate a number representing a negative value of A, −A;

a second number generator operative to generate a number representing a negative value of A minus 1, −A−1;

a selector operative to select the output of the first number generator or the output of the second number generator in response to the value of the carry bit;

a comparator operative to generate a zero result signal indicative of the sum being zero in dependence upon a comparison of the selected value with the value of the second number B.

2. A zero result detector as claimed in claim 1, wherein operation of the first number generator, the second number generator and the selector is independent of the second number B such that the second number B may be input to said zero result detector later than the first number A.

3. A zero result detector according to claim 1, wherein the first and second number generators use 2's complement notation for representing negative values.

4. A zero result detector according to claim 3, wherein:

the second number generator for generating a number representing the negative value of A minus 1, comprises an inverter for inverting the first number A; and the first number generator for generating a number representing a negative value of A comprises an inverter for inverting the first number A and an incrementor for adding 1 to the output of the inverter.

5. A zero result detector according to claim 4, wherein the inverter of the first number generator and the inverter of the second number generator are the same single inverter.

6. A method of detecting a zero result of a sum of a first number A, a second number B and a carry bit C, wherein A and B are binary numbers, the method comprising the steps of:

generating a first number representing a negative value of A, −A;

generating a second number representing a negative value of A minus 1, −A−1;

selecting either the first number or the second number in response to the value of the carry bit;

comparing the selected value with the value of the second number B, and generating a zero result signal indicative of the sum being zero when the values are equal.

7. A zero result detector for detecting when the sum of a first number A, a second number B and a carry bit C is equal to zero, wherein A and B are binary numbers, the zero result detector comprising:

a first number generator operative to generate a number representing a negative value of A, −A;

a second number generator operative to generate a number representing a negative value of A minus 1; −A−1;

a selector operative to select the output of the first number generator or the output of the second number generator in response to the value of the carry bit; and a comparator operative to generate a zero result signal indicative of the sum being zero in dependence upon a comparison of the selected value with the value of the second number B;

wherein operation of the first number generator, the second number generator and the selector is independent of the second number B such that the second number B may be input to said zero result detector later than the first number A.

8. A method of detecting a zero result of a sum of a first number A, a second number B and a carry bit C, wherein A and B are binary numbers, the method comprising the steps of:

generating a first number representing a negative value of A, −A;

generating a second number representing a negative value of A minus 1, −A−1;

selecting either the first number or the second number in response to the value of the carry bit; and comparing the selected value with the value of the second number B, and generating a zero result signal indicative of the sum being zero when the values are equal;

wherein said first number generating step, said second number generating step and said selecting step are each independent of the second number B, such that the second number B may be input to a zero result detector later than the first number A.

* * * * *